United States Patent [19]

Hucks et al.

[11] 4,055,611
[45] Oct. 25, 1977

[54] SHORT GLASS FIBERS COVERED WITH POLYMERIC MATERIALS

[75] Inventors: Uwe Hucks, Duisburg; Hugo Vernaleken, Krefeld-Bockum, both of Germany

[73] Assignee: Bayer Aktiengesellschaft, Leverkusen, Germany

[21] Appl. No.: 561,827

[22] Filed: Mar. 25, 1975

[30] Foreign Application Priority Data

Mar. 27, 1974 Germany .............................. 2414804

[51] Int. Cl.² .......................... B29C 3/00; B22D 13/04; B22D 23/08; B22D 19/00
[52] U.S. Cl. ........................................... 264/6; 264/8
[58] Field of Search ............. 260/37 PC, 42.14, 42.18; 427/221, 242; 428/378, 391, 392, 403, 405, 406, 412; 264/134, 6, 8

[56] References Cited

U.S. PATENT DOCUMENTS

| 2,807,556 | 9/1957 | Stark | 427/221 |
|---|---|---|---|
| 2,829,982 | 4/1958 | Hoyt | 427/221 |
| 2,936,487 | 5/1960 | Paz | 260/42.18 |
| 3,130,070 | 4/1964 | Potters | 427/221 |
| 3,386,851 | 6/1968 | Harlan | 427/221 |
| 3,398,012 | 8/1968 | Parkes et al. | 427/221 |
| 3,425,862 | 2/1969 | Eakins | 428/392 |
| 3,437,632 | 4/1969 | Hechelhammer et al. | 260/37 PC |
| 3,443,492 | 5/1969 | Pleass | 427/221 |
| 3,488,317 | 1/1970 | Hechelhammer | 260/37 PC |
| 3,507,686 | 4/1970 | Hagenbach | 427/221 |
| 3,635,752 | 1/1972 | Baer et al. | 260/42.14 |
| 3,635,879 | 1/1972 | Baer et al. | 260/42.14 |
| 3,671,378 | 6/1972 | Baer et al. | 260/42.18 |
| 3,671,384 | 6/1972 | Baer | 260/42.18 |
| 3,677,804 | 7/1972 | Kalnin et al. | 427/221 |
| 3,678,079 | 7/1972 | Carty et al. | 260/37 PC |

*Primary Examiner*—James R. Hoffman
*Attorney, Agent, or Firm*—Gene Harsh; Lawrence S. Pope; Frederick H. Colen

[57] ABSTRACT

This invention provides spheres of high molecular weight thermoplastics filled with short glass fibers which may be easily metered, incorporated into thermoplastic resins or fused into glass mats or shaped articles. It also provides a method of producing such spheres by treating glass fibers with a dilute (1 to 30 wt% strength) solution of the plastic having a viscosity of less than 1,000 cP. The fibers are rotated with the polymer solution and the solvent is subsequently evaporated off. Preferably, the coating plastic is a high molecular weight thermoplastic.

11 Claims, 1 Drawing Figure

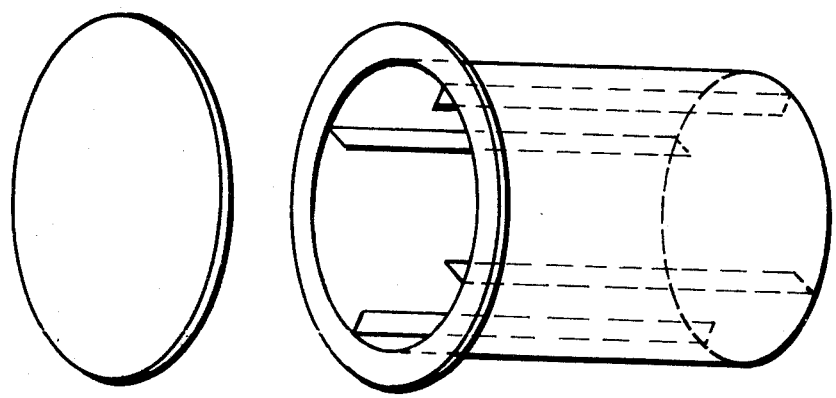

SHORT GLASS FIBERS COVERED WITH POLYMERIC MATERIALS

BACKGROUND OF THE INVENTION

DT-AS German Published Specification No. 1,244,347 (respectively British Pat. No. 1,047,840) describes a process for the manufacture of short glass fibers which can be metered. According to this, short glass fibers, which are very difficult to meter by the customary processes, are converted into the form of granules by treatment in, for example, organic solvents. The said patent specification also contains a note that the solvents can contain, for example, sizes.

SUMMARY OF THE INVENTION

The present invention relates to spheres of high molecular weight thermoplastics filled with short glass fibers which contain 1–30% by weight of high-polymer plastics, and to a process for the manufacture of these short glass fibers coated with high-polymer plastics, which is characterized in that short glass fibers are treated in solutions of these plastics of viscosities <1,000 cP in rotating apparatuses and are subsequently freed from the solvents used by drying.

BRIEF DESCRIPTION OF THE DRAWING

The FIGURE is a schematic of a cylindrical vessel which can be rotated about its longitudinal axis fitted with four metal sheets arranged radially along the vessel wall in which the spheres of high molecular weight thermoplastics filled with short glass fibers according to the present invention may be prepared.

DETAILED DESCRIPTION OF THE INVENTION

The short glass fibers according to the invention, which are covered with polymeric materials, have an extremely stable spherical form even if they only contain 1–30% by weight, preferably 1–5% by weight, of high-polymer plastics, and can then only be deformed by high pressure. Even in a prolonged shaking test they show practically no abrasion. They can be metered in a simple manner, for example, by means of belt weighers or by apparatuses working on a volumetric principle. The advantage of the short glass fiber coated with plastic, over the state of the art is the high resistance to pressure, which is of use, for example, in the case of silo storage, and the abrasion resistance. The high abrasion resistance is believed to be due to the fact that the glass fibers are virtually entirely encased in a spherical shell. This surprising result is evidently due to the fact the major portion of the polymeric plastic is deposited on the surface of the glass fiber. This encapsulation also almost totally obviates the hazard of glass fiber dust which is encountered when using meterable glass fibers such as those taught by DT-AS German Published Specification No. 1,244,347 respectively equivalent British Pat. No. 1,047,840.

A further surprising advantage of the short glass fibers, coated with plastic according to the invention is that when incorporating glass fibers into plastics which according to the present invention are also used as the coating material, disintegration of the glass fibers by a grinding action, for example, in the screw machine which are suitable for the incorporation of the glass fibers, is greatly reduced. Therefore, the technically involved metering of the glass fibers into the previously fused plastic mass is no longer required. In addition, glass fiber-reinforced plastic molding compositions of higher quality are produced.

When using the short glass fibers, coated with plastic, according to the invention, it is possible to feed plastics, together with glass fiber material, into the screw machines through a hopper of the machine and thus to produce glass fiber-reinforced plastics in a simple manner.

When using the short glass fibers according to the invention, material abrasion in the screw machine is also reduced.

The plastic-coated glass fibers according to the invention, containing about 5–30% by weight of plastic coatings, are suitable for use as the base material for the manufacture of glass fiber mats. In the process of manufacture of the glass mats, the plastic spheres, filled with short glass fibers according to the invention are converted to the desired shaped articles in a press at molding temperatures above the melting ranges of the plastics which have been applied to the short glass fibers. The mats are dimensionally very stable and have an abrasion-resistant surface. They can be stored, and handled, in a simple manner. Special precautionary measures prior to possible further processing are no longer necessary.

The short glass fibers coated with plastic according to the invention are manufactured in a simple manner in known apparatuses and the manufacture can be carried out continuously or discontinuously.

A suitable process is to mix a plastic solution, which is obtained by dissolving the plastic in a suitable solvent, and the short glass fibers in a vessel which rotates about an axis and to rotate the vessel for a period of 2–60 minutes. Thereafter, the drying can be effected in the same apparatus or in a separate part of the apparatus, by evaporating the solvents at elevated temperatures or by using vacuum. After the drying has taken place, the plastic-coated short glass fibers or plastic spheres filled with short glass fibers can be removed from the apparatuses, and can be employed for the applications mentioned.

Suitable apparatuses for the manufacture of the plastic-coated short glass fibers are, for example, drums, rotary tubes and tumbler driers. It is frequently desired to ensure good distribution of the charge by providing inserts in the apparatus and thereby at the same time avoiding the glass fiber material slipping down the wall of the vessel.

To achieve optimum results with regard to duration of treatment and shape and size distribution of the plastic spheres filled with short glass fibers, it is of advantage so to choose the ratio of the amount of glass fiber to the polymer solution such that after conversion of the short glass fibers to the plastic spheres, there is no polymer solution left present; in other words, the polymer solution should be absorbed practically quantitatively on the short glass fiber. This is the case if the weight ratio of the amount of glass fibers to the polymer solution varies approximately within the limits 1:0.5 to 1:5. Parameters which determine the optimum ratio are, for example, the solids content and the viscosity of the polymer solution on the one hand, and the nature of the short glass fibers such as average fiber length, diameter and wettability, on the other.

It has proved desirable to utilize about ¼ to 2/3 of the available reactor volume when manufacturing the plastic-coated short glass fibers.

The moist short glass fibers are generally manufactured under normal pressure at room temperature, but always below the boiling point of the solvents used. Raising the temperature produces no direct advantage with regard to accelerated performance of the process, but can be of importance as regards the subsequent drying process.

The speed of rotation of the apparatuses is generally not a critical parameter. However, to avoid rather long treatment times, it is desirable to work at the upper limit of the permissible rates of revolution of the particular apparatus. Circumferential velocities of the rotating vessel which cause intense turbulent mixing of the charge, are to be avoided. Circumferential speeds of 0.1 m/sec to 5 m/sec, preferably 0.1 m/sec to 1 m/sec, have proved of value.

The plastic-coated short glass fibers in general have an average diameter between 1 mm and 15 mm and preferably between 2 mm and 10 mm. The size of the granules can be reduced by prolonged treatment in the rotating apparatuses.

The concentration of the polymer solutions is in general between 1 and 30% by weight. It depends primarily on the amount of plastic with which the short glass fibers are to be coated. The process can be carried out without problems if the viscosities of the polymer solutions are $<1,000$ cP.

The drying process is also carried out according to known techniques and in known apparatuses. In addition to the discontinuously operating apparatuses such as drying cabinets, drying towers, tumbler driers and heated vessels, continuously operating apparatuses such as rotary tubes, disc driers and paddle driers are also suitable.

In general, drying takes place very rapidly since the plastic-coated short glass fibers have a capillary action and convey the solvents to the surface. This also explains the fact that the plastics preferentially cover the surfaces of the short glass fibers. The temperatures are so chosen, in accordance with the solvents used, that the melting points of the plastics are not reached, the margin of safety being approximately 50° C. It is advisable to carry out the drying with exclusion of air. Only in the case of high-boiling point solvents is the use of vacuum or direct heating with hot inert gases or steam necessary, and in such cases these methods can be considered.

During the drying process, there is no further direct need for mixing the charge, but mixing can be of importance from the point of view of better heat transfer, and is advisable in such cases.

Suitable short glass fibers are the commercially available products such as are used, for example, to manufacture glass fiber-reinforced thermoplastics, these products having fiber lengths between 0.1 and 10 mm, preferably between 0.1 and 6 mm. These materials can be employed with and without sizes and with and without adhesion promoters, without causing any disadvantages. No special measures are required before these fibers are used.

The high-molecular thermoplastics which are soluble in the organic solvents mentioned later are suitable for covering and coating the short glass fibers with plastics. The following should be mentioned, inter alia: vinyl polymers such as polystyrene, polystyrene-acrylonitrile, polymethyl methacrylate, polyacrylonitrile, ethylene polymers and propylene polymers and polyvinyl chloride, and polycondensates such, as for example, aromatic polycarbonates, polyesters, cellulose esters, polyamides, polyphenylene oxide, polysulphones and polysilicones. The molecular weights (Mn) of these thermoplastics should preferably be between 10,000 and 300,000.

It is also possible to use non-thermoplastic plastics, for example, unsaturated polyester resins, phenolic resins or polyurethanes, with preferred molecular weights (Mn) between 3,000 and 20,000. These plastics are preferentially used for the manufacture of the glass fiber mats. When they are used to manufacture plastic-coated short glass fibers it is necessary to ensure that the process temperature used does not produce curing of the polymer. This is not a danger when using low-boiling solvents such as, for example, methylene chloride, chloroform, benzene or petroleum ether. Low temperatures can be ensured and such problems avoided by drying in vacuo. Virtually the only polymeric materials which are unsuitable for use as polymeric coating substances are those which lead to stickiness. However, this is essentially the case for extremely low-molecular products.

Solvents which can be used for the plastics mentioned, in the abovementioned concentrations of 1% by weight to 30% by weight, are the substances known, and described in the literature. As already mentioned, low-boiling solvents are used in particular. The following may be mentioned as examples: methylene chloride, chloroform, 1,2-dichloroethane, ethyl acetate and butyl acetate, acetone, benzene and toluene. For polyamides specifically, formic acid can be used. For aromatic polyesters, a mixture of trifluoroacetic acid and methylene chloride or chloroform has proved of value.

The plastic-coated short glass fibers or plastic spheres filled with short glass fibers are used to manufacture glass fiber-reinforced thermoplastics and to manufacture glass fiber mats.

In addition to the coating of glass fibers, other fiber materials, for example mineral fibers or carbon fibers or other inorganic fibers can also be coated with plastics by this process.

EXAMPLES

A. Apparatuses

Two apparatuses were used for the manufacture of the plastic-coated short glass fibers.

Apparatus 1 consists of a cylindrical vessel of 400 mm diameter and 800 mm length, with a useful capacity of approximately 100 liters. This vessel is fitted with four 50 mm wide metal sheets arranged radially along the vessel wall. The vessel can be rotated about its longitudinal axis by a device. (see the FIGURE)

Apparatus 2 consists of a tumbler drier (diameter 1000 mm, length 1300 mm, useful capacity 700 liters), which can be heated, and the axis of rotation of which runs diagonally. A connection to a vacuum unit provides the possibility of operating this apparatus under vacuum.

B. Plastics

The following plastics are employed:

a. Bisphenol A (2,2-bis-(4-hydroxyphenyl)propane) polycarbonate; $\eta_{rel}$ 1.289 (0.5% strength in methylene chloride).

b. Polystyrene; $\eta_{rel}$ 1.59 (0.5% strength in methylene chloride).

c. Polystyrene-acrylonitrile (80/20); $\eta_{rel}$ 1.70 (0.5% strength in methylene chloride).

d. Polymethyl methacrylate; $\eta_{rel}$ 1.345 (0.5% strength in methylene chloride).

e. Polyethylene glycol terephthalate; $\eta_{rel}$ 1.34 (0.5% in 50:50, phenol/1,2-dichloroethane).

f. Polyester based on fumaric acid and propoxylated bisphenol A (2,2-bis-(4-hydroxyphenyl)propane); number average molecular weight (Mn) approximately 3,000.

C. Glass Fibers

Two types of glass fibers are employed.

I. Ground short glass fibers; average fiber length 230μ, diameter 13μ, proportion of powder (<50μ) 5%.

II. Long glass fiber: average fiber length 6.0 mm, diameter 15μ, proportion of powder (<50μ) approximately 1%.

EXAMPLES 1-23

Glass fibers and plastic solutions are treated, and subsequently freed from solvents by drying, in apparatuses 1 and 2 which have been described, and under the conditions specified in Table 1.

The average diameter of the plastic-coated short glass fibers obtained and, in the case of some products, the size distribution is determined. These data are summarized in Table 2.

In a further test, the exposure to pressure of the plastic-coated short glass fibers are determined. In this test, a plastic-coated short glass fiber sphere of 5 mm diameter is exposed to a weight of 5 kg and its relative deformation in the direction of the force is measured. The values for short glass fiber sphere not coated with plastic is quoted for comparison.

EXAMPLE 24

70 parts by weight of polycarbonate and 30 parts by weight of the coated short glass fibers obtained from Example 15 are converted to a glass fiber-reinforced polycarbonate 24a in a twin screw extruder (screw diameter 120 mm). The throughput is 500 kg/hour. In a parallel experiment, commercially available short glass fibers (polycarbonate 24b) and short glass fibers which can be metered, manufactured according to DT-AS German Published Specification No. 1,244,347 (polycarbonate 24c) are employed.

While a belt weigher suffices for metering the plastic-coated short glass fibers and allows dust-free operation, a feed screw must be used for metering the glass fibers when manufacturing polycarbonate 24b; the maximum throughput in this case is 300 kg/hr. When manufacturing polycarbonate 24c, severe dustiness is observed when using a belt weigher for metering. The metering device is heavily covered with dust after only one hour of operation. The operators have to wear dust-protection clothing.

The mechanical properties of the polycarbonates produced are tested. The distribution of glass fiber lengths and the proportion of powder, are determined.

| Example | Polycarbonates | | |
|---|---|---|---|
| | 24a | 24b | 24c |
| Notched impact strength (kp/cm) | 8.3 | 4.7 | 6.6 |
| Impact strength (kp/cm) | 58.4 | 32.9 | 40.8 |
| Flexural strength (kp/cm$^2$) | 1,560 | 1,280 | 1,310 |
| E-modulus (kp/cm$^2$) | 62,000 | 53,000 | 54,000 |
| Average glass fiber length (μ) | 145 | 105 | 110 |
| Proportion of powder (<50μ), % | 7 | 18 | 15 |

TABLE 1

| Example No. | Glass Fiber Type | Glass Fiber Amount (kg) | Plastics Type | Plastics Solvent | Concentration (%) | Amount (kg) | Apparatus Type | Duration (min) | rpm | Drying Temperature (° C) |
|---|---|---|---|---|---|---|---|---|---|---|
| 1 | I | 7.5 | a) | methylene chloride | 3.0 | 7.5 | 1 | 30 | 25 | 100 |
| 2 | I | 10.0 | a) | " | 3.0 | 10.0 | 1 | 30 | 25 | 100 |
| 3 | I | 8.0 | a) | " | 11.1 | 8.0 | 1 | 20 | 25 | 100 |
| 4 | I | 9.0 | c) | " | 10.0 | 7.5 | 1 | 15 | 20 | 50/vacuum |
| 5 | I | 10.0 | a) | " | 23.3 | 9.5 | 1 | 30 | 15 | 100 |
| 6 | I | 12.5 | d) | " | 3.0 | 12.5 | 1 | 30 | 20 | 50/vacuum |
| 7 | I | 7.5 | d) | acetone | 3.0 | 10.0 | 1 | 30 | 20 | 50/vacuum |
| 8 | I | 7.5 | b) | benzene | 3.0 | 7.5 | 1 | 30 | 20 | 50/vacuum |
| 9 | I | 5.0 | e) | 1:9, trifluoro-acetic acid/chloroform | 1.0 | 5.0 | 1 | 30 | 20 | 100 |
| 10 | I | 7.5 | e) | " | 3.0 | 7.5 | 1 | 30 | 20 | 100/vacuum |
| 11 | I | 15.0 | a) | methylene chloride | 1.0 | 15.0 | 1 | 30 | 20 | 100 |
| 12 | I | 5.0 | f) | " | 20.0 | 5.0 | 1 | 30 | 25 | 50/vacuum |
| 13 | I | 7.5 | f) | 1:1, methylene chloride/styrene | 20.0 | 7.5 | 1 | 30 | 25 | 70 |
| 14 | I | 5.0 | f) | methylene chloride | 9.0 | 6.5 | 1 | 30 | 25 | 70 |
| 15 | I | 35.0 | a) | " | 3.0 | 35.0 | 2 | 60 | 3 | 100 |
| 16 | II | 6.0 | a) | " | 3.0 | 6.0 | 1 | 20 | 25 | 100 |
| 17 | II | 8.0 | a) | " | 3.0 | 10.0 | 1 | 20 | 25 | 100 |
| 18 | I | 10.0 | a) | methylene chloride | 10.0 | 7.5 | 1 | 30 | 20 | 100 |
| 19 | I | 10.0 | a) | " | 10.0 | 10.0 | 1 | 10 | 20 | 100 |
| 20 | I | 5.0 | a) | " | 15.0 | 5.0 | 1 | 30 | 20 | 100 |
| 21 | I | 60.0 | a) | " | 3.0 | 60.0 | 2 | 30 | 3 | 100 |
| 22 | I | 60.0 | a) | " | 10.0 | 40.0 | 2 | 30 | 3 | 100 |
| 23 | I | 40.0 | a) | " | 18.5 | 50.0 | 2 | 30 | 3 | 100 |

TABLE 2

| Product from Example No. | Plastic sphere size distribution | | | Deformation (%), 5 kg load, size of plastic spheres 5 mm |
|---|---|---|---|---|
| | Average Value (mm) | Proportion 2 mm (%) or less | 10 mm (%) or more | |
| Comparison x) | 4.4 | <5 | <10 | 40 – 60 |
| 1 | 4.7 | <5 | <5 | 10 – 15 |
| 3 | 5.2 | <5 | <5 | <10 |
| 4 | 3.9 | <5 | <10 | <5 |
| 5 | 6.8 | <10 | <10 | <10 |
| 6 | 3.5 | <5 | <5 | |
| 8 | 2.9 | <10 | <5 | |
| 10 | 4.2 | <5 | <5 | |
| 16 | 7.5 | <5 | <15 | |
| 21 | 3.6 | <5 | <10 | | x) without plastic coating according to DT-AS (German Published Specification) 1,244,347; solvent: methylene chloride.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Process for the production of spheres of high molecular weight organic thermoplastic resins filled with short glass fibers having an average diameter of 1 to 15 mm and containing from 1 to 30% by weight of high molecular weight thermoplastics comprising:
   a. mixing short glass fibers having an average length of between 0.1 and 10mm in a 1 to 30% strength by weight solution of high molecular weight thermoplastics having a viscosity less than 1,000 cP;
   b. rotating the mixture of short glass fibers and high molecular weight thermoplastics solution in an apparatus which rotates about an axis which passes through said apparatus to form spheres of high molecular weight thermoplastics filled with short glass fibers; and
   c. subsequently drying the spheres of high molecular weight thermoplastics filled with short glass fibers to free said spheres from solvent.

2. Process according to claim 1 in which the spheres of high molecular weight thermoplastics filled with short glass fibers produced have an average diameter of 2 to 10 mm.

3. Process according to claim 1 in which the average fiber length of the glass fibers are between 0.1 and 6 mm.

4. Process according to claim 1 in which the molecular weight (Mn) of the thermoplastics is between 10,000 and 300,000.

5. Process according to claim 1 in which the thermoplastics are selected from the group consisting of vinyl polymers and polycondensates.

6. Process according to claim 1 in which the spheres of high molecular weight thermoplastics filled with short glass fibers contain 1 to 5% by weight of thermoplastics.

7. A process for reinforcing a thermoplastic resin comprising incorporating therein spheres of high molecular weight thermoplastics filled with short glass fibers produced by the process of claim 6.

8. Process according to claim 1 in which the spheres of high molecular weight thermoplastics filled with short glass fibers contain 5 to 30% by weight of thermoplastics.

9. A process for the production of a glass fiber mat comprising converting a plastic-coated glass fiber produced by the process of claim 8 to shaped articles in a press at a molding temperature above the melting range of the plastics which has been applied to coat the glass fibers.

10. A process for reinforcing a polycarbonate resin comprising incorporating therein spheres of high molecular weight polycarbonate filled with short glass fibers produced by the process of claim 1.

11. A process for the production of spheres of high molecular weight organic thermoplastic resins filled with fibers selected from the group consisting of mineral fibers, carbon fibers and other inorganic fibers exclusive of glass fibers having an average diameter of between 1 and 15 mm and containing from 1 to 30% by weight of high molecular weight thermoplastics comprising:
   a. mixing said fibers having an average length of between 0.1 and 10 mm in a 1 to 30% strength by weight solution of high molecular weight thermoplastics having a viscosity of less than 1000 cP;
   b. rotating the mixture of said fibers and high molecular weight thermoplastics solution in an apparatus which rotates about an axis which passes through said apparatus to form spheres of high molecular weight thermoplastics filled with said fibers; and
   c. subsequently drying the spheres of high molecular weight thermoplastics filled with said fibers to free said spheres from solvent.

* * * * *